(12) United States Patent
Miyamoto

(10) Patent No.: US 7,039,668 B2
(45) Date of Patent: May 2, 2006

(54) DIRECTORY SERVER SYSTEM FOR STORING HISTORY INFORMATION

(75) Inventor: Tsuyoshi Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1017 days.

(21) Appl. No.: 09/825,995

(22) Filed: Apr. 5, 2001

(65) Prior Publication Data

US 2001/0039588 A1    Nov. 8, 2001

(30) Foreign Application Priority Data

Apr. 5, 2000    (JP)    ............................... 2000-103569

(51) Int. Cl.
*G06F 15/16*    (2006.01)

(52) U.S. Cl. ..................... 709/201; 709/227; 709/229; 707/10; 707/104

(58) Field of Classification Search ................ 709/201, 709/203, 232, 224, 227, 229; 707/10, 104; 713/156
See application file for complete search history.

(56) References Cited

U.S. PATENT DOCUMENTS

| | | | | |
|---|---|---|---|---|
| 5,713,027 A | * | 1/1998 | Soejima et al. ............. | 713/300 |
| 6,088,717 A | * | 7/2000 | Reed et al. .................. | 709/201 |
| 6,247,012 B1 | * | 6/2001 | Kitamura et al. ............. | 707/10 |
| 6,442,587 B1 | * | 8/2002 | Yoshida ...................... | 709/203 |
| 6,668,353 B1 | * | 12/2003 | Yurkovic .................. | 715/501.1 |
| 6,715,073 B1 | * | 3/2004 | An et al. .................... | 713/156 |

FOREIGN PATENT DOCUMENTS

| | | |
|---|---|---|
| JP | 05-75628 | 3/1993 |
| JP | 06-141095 | 5/1994 |
| JP | 08-137950 | 5/1996 |
| JP | 09-054722 | 2/1997 |
| JP | 09-288510 | 11/1997 |
| JP | 10-023373 | 1/1998 |
| JP | 11-046215 | 2/1999 |
| JP | 11-146003 | 5/1999 |

* cited by examiner

*Primary Examiner*—Zarni Maung
*Assistant Examiner*—Khanh Quang Dinh
(74) *Attorney, Agent, or Firm*—Young & Thompson

(57) ABSTRACT

The present invention provides a directory server system comprising: a directory server for storing an attribute of an entry; an entity monitor being connected to the directory server for monitoring an entity, so that if a change in a state of the entity appears, then the entity monitor instructs the directory server to renew an attribute of a corresponding entry to the entity; and a directory renewal history storage device being connected to the directory server for storing a renewed attribute of the entry as attribute renewal history informations.

6 Claims, 1 Drawing Sheet

DIRECTORY SERVER SYSTEM FOR STORING HISTORY INFORMATION

BACKGROUND OF THE INVENTION

The present invention relates to a directory server system for storing history information, and more particularly to a directory server system for extending a service interface to users.

The conventional directory server system allows a user to access information about present or current states of users and equipment registered on the server. Namely, the conventional directory server system stores only information about present or current states of users and equipment registered on the server. The user is unable to obtain the history about the states of the registered users or equipment and also is unable to confirm the exact renewal dates.

In the above circumstances, it had been required to develop a novel directory server system free from the above problem.

SUMMARY OF THE INVENTION

Accordingly, it is an object of the present invention to provide a novel directory server system free from the above problems.

It is a further object of the present invention to provide a novel directory server system for storing history about the states of the registered users or equipment.

It is a still further object of the present invention to provide a novel directory server system for storing the exact renewal dates of the states.

It is yet a further object of the present invention to provide a novel directory server system for providing renewed information about history of the states of the registered users or equipment.

The present invention provides a directory server system that includes a directory server for storing an attribute of an entry, an entity monitor connected to the directory server for monitoring an entity so that if a change in a state of the entity appears the entity monitor instructs the directory server to renew an attribute of a corresponding entry to the entity, and a directory renewal history storage device connected to the directory server for storing a renewed attribute of the entry as attribute renewal history information.

The above and other objects, features and advantages of the present invention will be apparent from the following description.

BRIEF DESCRIPTION OF THE DRAWINGS

Preferred embodiments according to the present invention will be described in detail with reference to the accompanying drawings.

DISCLOSURE OF THE INVENTION

Figure 1:
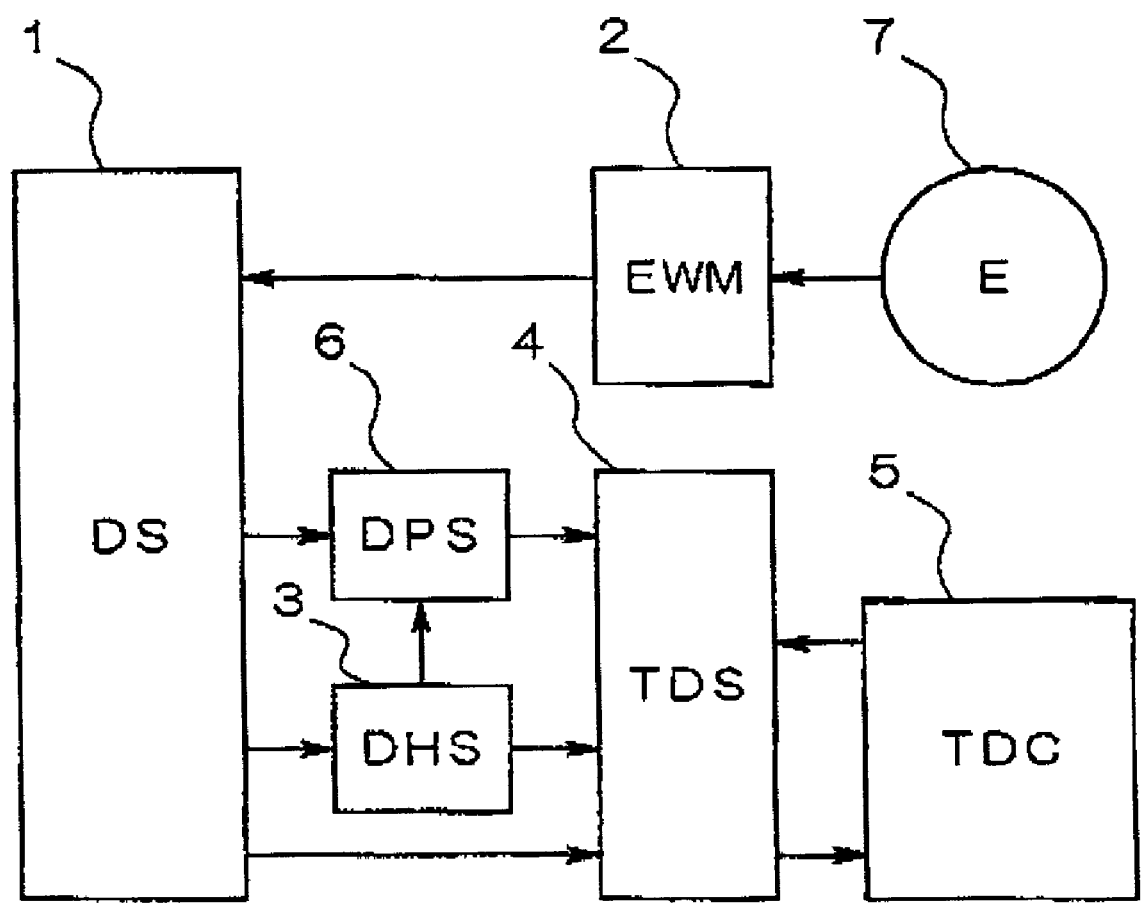
FIG. 1 is a block diagram illustrative of a structure of a novel directory server system in a first embodiment in accordance with the present invention.

The present invention provides a directory server system that includes a directory server for storing an attribute of an entry, an entity monitor connected to the directory server for monitoring an entity so that if a change in a state of the entity appears the entity monitor instructs the directory server to renew an attribute of a corresponding entry to the entity, and a directory renewal history storage device connected to the directory server for storing a renewed attribute of the entry as attribute renewal history information.

It is preferable to further include a time-correspondent directory server connected to both the directory server and the directory renewal history storage device for confirming an existence of a target entry on the directory server, so that if the existence of the target entry on the directory server could be confirmed, then the time-correspondent directory server obtains the attribute renewal history information from the directory renewal history storage device.

It is preferable to furthermore include a directory purging entry storage device connected to the directory server, the directory renewal history storage device and the time-correspondent directory server for storing an entry corresponding to an absent entity which has become absent from the directory server.

It is moreover preferable that if the entity becomes absent, then the attribute renewal history information of a corresponding entry to the absent entity is deleted from the directory renewal history storage device, and in place the directory purging entry storage device stores the attribute renewal history information.

It is preferable to moreover include a time-correspondent directory client connected to the time-correspondent directory server for sending the time-correspondent directory server a request for obtaining attribute history information at a past time of an entry from the time-correspondent directory server in order to refer the attribute history information at the past time.

It is also preferable that if the request from the time-correspondent directory client is free of any access right, then the time-correspondent directory server rejects the request and sends the time-correspondent directory client a notice to the effect that the request is illegal.

It is preferable to further include a time-correspondent directory client connected to the time-correspondent directory server for sending the time-correspondent directory server a request for obtaining attribute history information during a past time period of an entry from the time-correspondent directory server in order to refer the attribute history information during the past time period.

It is furthermore preferable that if the request from the time-correspondent directory client is free of any access right, then the time-correspondent directory server rejects the request and sends the time-correspondent directory client a notice to the effect that the request is illegal.

It is also preferable that the directory renewal history storage device also stores renewal time and date together with the renewed attribute of the entry as attribute renewal history information.

PREFERRED EMBODIMENT

A first embodiment according to the present invention will be described in detail with reference to the drawings. FIG. 1 is a block diagram illustrative of a structure of a novel directory server system in a first embodiment in accordance with the present invention. The novel directory server system has the following structure. A directory server 1 is provided for storing attribute information of entries. An entity status monitor 2 is connected to the directory server 1 for monitoring the change of states of the entity 7 which corresponds to registered users or equipment, so that the entity status monitor 2 renews the attribute information of the entries stored in the directory server 1 upon change of the states of the entity 7. A directory renewal-history storage device 3 is connected to the directory server 1 for storing renewal dates and renewed content of the directory server 1. A directory purging entry storage device 6 is connected to both the directory server 1 and the directory renewal-history storage device 3 for storing all of the attribute renewal history information for an absent entry on the directory server 1, wherein the absent entry corresponds to the past-entity 7 which is currently absent. A time-correspondent directory server 4 is connected to the directory server 1, the directory renewal-history storage device 3 and the directory purging entry storage device 6 for generating attribute renewal history information. A time-correspondent directory client 5 is connected to the time-correspondent directory server 4 for obtaining the attribute renewal history information from the time-correspondent directory server 4 and displaying the same.

Operation of the above novel directory server system will be described. The entity status monitor 2 continuously or periodically monitors the service state of the entity 7. If any change in the service state of the entity 7 appears, then the attribute of the entry corresponding to the entity 7 is renewed by the directory server 1, wherein the entry is stored in the directory server 1. The directory server 1 sends the renewal date and the renewed contents to the directory renewal-history storage device 3, so that the directory renewal-history storage device 3 stores the renewal date and the renewed contents.

The time-correspondent directory client 5 sends the time-correspondent directory server 4 a request for the past state of the entry on the directory server 1, so that the time-correspondent directory server 4 couples the information from the directory server 1 to the information from the directory renewal-history storage device 3 for sending only the requested information about the past state of the entry, whereby the time-correspondent directory client 5 receives the past state of the entry from the time-correspondent directory server 4.

The following description will focus on the detailed operation of the above directory server system. The entity status monitor 2 receives information about a change of the state of the entity 7. The entity status monitor 2 instructs the directory server 1 to renew the attribute information of the entry corresponding to the entity 7, wherein the entry exists on the directory server 1. The renewed information on the directory server 1 is sent to the directory renewal-history storage device 3 and stored in the directory renewal-history storage device 3.

If the entity 7 becomes absent, then the entity status monitor 2 instructs the directory server 1 to send the directory purging entry storage device 6 the entry corresponding to the entity 7, whereby the entry is deleted from the directory server 1, so that the directory purging entry storage device 6 stores the entry. Further, the directory purging entry storage device 6 obtains all attribute renewal history information of the target entry from the directory renewal-history storage device 3 in order to store all the attribute renewal history information, wherein the history information of the target entry is deleted from the directory renewal-history storage device 3.

The time-correspondent directory client 5 sends the time-correspondent directory server 4 a request for information about a past state at a past time of the entry on the directory server 1 or information about change of the past state in a past time period. The time-correspondent directory server 4 receives this request from the time-correspondent directory client 5, so that the time-correspondent directory server 4 confirms whether or not the target entry currently exists in the information on the directory server 1. If the target entry exists, then the time-correspondent directory server 4 obtains the attribute renewal history information from the directory renewal-history storage device 3. If the target entry does not exist currently in the informations on the directory server 1, then the time-correspondent directory server 4 confirms whether or not the target entry exists in the directory purging entry storage device 6. If the target entry exists, then the time-correspondent directory server 4 obtains information of the purging entry from the directory purging entry storage device 6. After the time-correspondent directory server 4 has obtained the information, then the time-correspondent directory server 4 sends the time-correspondent directory client 5 the requested time-correspondent information.

If it is necessary to prepare the entry on the directory server 1 in correspondence with the entity 7 for the supervisor for supervising the change of the state or for the equipment, then the manager of the director server 1 sets the entity status monitor 2 so that the entity status monitor 2 monitors the state change of the entity 7. The entry preparing information on the directory server 1 is stored as an initial state information of the entity 7 on the directory renewal-history storage device 3, wherein access rights are set to the individual entries of the directory renewal-history storage device 3.

If the state change appears on the entity 7, then the entity status monitor 2 obtains the state change information and instructs the directory server 1 to renew the attribute information of the entry corresponding to the entity 7 so that the attribute renewal information of the entry is stored in the directory renewal-history storage device 3.

If it is necessary to delete the entry on the directory server 1 in correspondence with the entity 7 for the supervisor for supervising the state change or the equipment, then the manager for the directory server 1 releases the entity status monitor 2 from monitoring the state change information of the entity 7. The information of the entry deletion from the directory server 1 is stored in the directory renewal-history storage device 3 and concurrently the directory renewal-history storage device 3 sends the directory purging entry storage device 6 all of the attribute renewal history information of the target entry. The access right to the history information in the directory renewal-history storage device 3 is succeeded to the purging entry on the directory purging entry storage device 6.

If a directory service user wishes to know a past state at a past time of the entry on the directory server 1, then the directory service user operates the time-correspondent directory client 5 to send the time-correspondent directory server 4 a request for obtaining the information about the past state by utilizing a Search Request of LADP provided under the following RFC2251 of IETF. An "X-search At Time" attribute filter is additionally specified in response to Attribute value Assertion under Filter Equality Match Rule in order to designate the date and time of the search target of the search target entry, wherein "X-search At Time" accords to the syntax (1.3.6.1.4.1.1466.115.121.1.24 DESC 'Generalized Time').

The time-correspondent directory server 4 removes the "X-search At Time" from the received Search Request Filter to obtain the Search Request of LDAP, so that the time-correspondent directory server 4 utilizes the Search Request of LDAP in order to confirm the existence of the entry in the directory server 1. If the existence of the entry is confirmed, then the time-correspondent directory server 4 obtains the attribute renewal history information of the entry from the directory renewal-history storage device 3, so that the time-correspondent directory server 4 forms attribute information at a time when the request is issued, in order to respond to the time-correspondent directory client 5. If the directory service user has no access right to the attribute renewal history information of the entry, then the time-correspondent directory server 4 rejects the request and sends the time-correspondent directory client 5 an error response which indicates that the request is illegal.

If the time-correspondent directory server 4 could not confirm the presence of the target entry on the directory server 1, then the time-correspondent directory server 4 attempts to confirm the presence of the target entry on the directory purging entry storage device 6 in order to confirm whether or not the target entry has already been deleted from the directory server 1. If the target entry does not exist on the directory purging entry storage device 6 or if the directory service user has no access right, then the time-correspondent directory server 4 rejects the request and sends the time-correspondent directory client 5 an error response which indicates that the request is illegal. If the target entry is present on the directory server 1, then the time-correspondent directory server 4 obtains the attribute renewal history information of this entry, so that the time-correspondent directory server 4 forms attribute information at a time when the request is issued, in order to respond to the time-correspondent directory client 5. If the entry has been deleted at the time when the request was issued, then the time-correspondent directory server 4 sends the time-correspondent directory client 5 both a notice to the effect that the entry has already been deleted and a final state of the entry.

If a directory service user wishes to know a past state history during a past time period of the entry on the directory server 1, then the directory service user operates the time-correspondent directory client 5 to send the time-correspondent directory server 4 a request for obtaining the information about the past state history by utilizing a Search Request of LADP provided under the following RFC2251 of IETF. Both an "X-search Start Time" attribute filter and an "X-search End Time" attribute filter are additionally specified in response to Attribute value Assertion under Filter Equality Match Rule in order to designate both the start date and time of starting the search target of the search target entry and the end date and time of ending the search target of the search target entry, wherein "X-search At Time" and "X-search End Time" accord to the syntax (1.3.6.1.4.1.1466.115.121.1.24 DESC 'GeneralizedTime').

The time-correspondent directory server 4 removes the "X-search Start Time" and "X-search End Time" from the received Search Request Filter to obtain the Search Request of LDAP, so That the time-correspondent directory server 4 utilizes the Search Request of LDAP in order to confirm the existence of the entry in the directory server 1. If the existence of the entry could be confirmed, then the time-correspondent directory server 4 obtains the attribute renewal history information of the entry from the directory renewal-history storage device 3, so that the time-correspondent directory server 4 forms attribute information at the started time of the requested time period and a post attribute renewal history information, in order to respond to the time-correspondent directory client 5. If the directory service user has no access right to the attribute renewal history information of the entry, then the time-correspondent directory server 4 rejects the request and sends the time-correspondent directory client 5 an error response which indicates that the request is illegal.

If the time-correspondent directory server 4 could not confirm the presence of the target entry on the directory server 1, then the time-correspondent directory server 4 attempts to confirm the presence of the target entry on the directory purging entry storage device 6 in order to confirm whether or not the target entry has already been deleted from the directory server 1. If the target entry does not exist on the directory purging entry storage device 6 or if the directory service user has no access right, then the time-correspondent directory server 4 rejects the request and sends the time-correspondent directory client 5 an error response which indicates that the request is illegal. If the target entry is present on the directory server 1, then the time-correspondent directory server 4 obtains the attribute renewal history information of this entry, so that the time-correspondent directory server 4 forms attribute information for the requested time period and the attribute renewal history information, in order to respond to the time-correspondent directory client 5. If the entry has been deleted before the requested time period, then the time-correspondent directory server 4 sends the time-correspondent directory client 5 both a notice to the effect that the entry has already been deleted and a final state of the entry.

Accordingly, the above described novel directory server system allows the user to operate the time-correspondent directory client to refer the attribute renewal history information on the renewed directory server 1, thereby obtaining the past-entry on the directory server 1 and the informations about the status changes of the person or equipment which corresponds to the entry.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A directory server system comprising:
   a directory server for storing an attribute of an entry;
   an entity monitor connected to said directory server for monitoring an entity, so that if a change in a state of said entity appears, then said entity monitor instructs said directory server to renew an attribute of a corresponding entry to said entity;
   a directory renewal history storage device connected to said directory server for storing a renewed attribute of said entry as attribute renewal history information;
   a time-correspondent directory server connected to both said directory server and said directory renewal history storage device for confirming an existence of a target entry on said directory server, so that if said existence of said target entry on said directory server could be confirmed, then said time-correspondent directory server obtains said attribute renewal history information from said directory renewal history storage device;
   a directory purging entry storage device connected to said directory server, said directory renewal history storage device and said time-correspondent directory server for storing an entry corresponding to an absent entity which has become absent from said directory server,
   wherein if said entity becomes absent, then said attribute renewal history information of a corresponding entry to said absent entity is deleted from said directory renewal history storage device and stored in said directory purging entry storage device.

2. The directory server system as claimed in claim 1, further comprising a time-correspondent directory client connected to said time-correspondent directory server for sending said time-correspondent directory server a request for obtaining attribute history information at a past time of an entry from said time-correspondent directory server in order to refer to said attribute history informations at said past time.

3. The directory server system as claimed in claim 2, wherein if said request from said time-correspondent directory client is free of any access right, then said time-correspondent directory server rejects said request and sends said time-correspondent directory client a notice to the effect that said request is illegal.

4. The directory server system as claimed in claim 1, further comprising a time-correspondent directory client connected to said time-correspondent directory server for sending said time-correspondent directory server a request for obtaining attribute history information during a past time period of an entry from said time-correspondent directory server in order to refer to said attribute history informations during said past time period.

5. The directory server system as claimed in claim 4, wherein if said request from said time-correspondent directory client is free of any access right, then said time-correspondent directory server rejects said request and sends said time-correspondent directory client a notice to the effect that said request is illegal.

6. The directory server system as claimed in claim 1, wherein said directory renewal history storage device also stores renewal time and date together with said renewed attribute of said entry as attribute renewal history information.

* * * * *